US009879596B1

(12) United States Patent
Bogen et al.

(10) Patent No.: US 9,879,596 B1
(45) Date of Patent: Jan. 30, 2018

(54) ACTUATOR ASSEMBLY HAVING AT LEAST ONE DRIVEN GEAR COUPLED TO A HOUSING

(71) Applicant: BorgWarner Inc., Auburn Hills, MI (US)

(72) Inventors: Martin P. Bogen, St. Clair Shores, MI (US); Robert D. Keefover, Lake Orion, MI (US); James C. Sharpe, South Lyon, MI (US); Brian C. Wightman, Davisburg, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/492,051

(22) Filed: Apr. 20, 2017

(51) Int. Cl.
| | | |
|---|---|---|
| F02B 33/00 | (2006.01) |
| F02B 37/24 | (2006.01) |
| F16H 19/00 | (2006.01) |
| F16H 37/12 | (2006.01) |
| F16H 57/02 | (2012.01) |
| H02K 7/116 | (2006.01) |
| H02K 11/33 | (2016.01) |
| H02K 11/21 | (2016.01) |

(52) U.S. Cl.
CPC ........... *F02B 37/24* (2013.01); *F16H 19/001* (2013.01); *F16H 37/12* (2013.01); *F16H 57/02* (2013.01); *H02K 7/116* (2013.01); *H02K 11/21* (2016.01); *H02K 11/33* (2016.01); *F16H 2057/02034* (2013.01)

(58) Field of Classification Search
CPC .......... F02B 39/04; F02B 39/06; F02B 37/24; F16H 19/001; F16H 37/12; F16H 57/02; F16H 2057/02034

USPC .............................................. 123/559.1, 561
See application file for complete search history.

(56) References Cited

U.S. PATENT DOCUMENTS

| | | | |
|---|---|---|---|
| 4,898,759 A | 2/1990 | Hoover et al. |
| 5,321,585 A | 6/1994 | Trittschuh, III et al. |
| 6,020,660 A | 2/2000 | Wright |
| 6,310,455 B1 | 10/2001 | Siraky et al. |
| 6,538,403 B2 | 3/2003 | Gorti et al. |
| 7,503,278 B2 | 3/2009 | Sigg et al. |
| 8,316,830 B2 * | 11/2012 | Keefover | F02D 9/1035 123/568.21 |
| 8,704,417 B2 | 4/2014 | Kamogi |

(Continued)

OTHER PUBLICATIONS

U.S. Appl. No. 15/492,114, filed Apr. 20, 2017, 42 pages.

*Primary Examiner* — Ching Chang
(74) *Attorney, Agent, or Firm* — Howard & Howard Attorneys PLLC

(57) ABSTRACT

An actuator assembly moves an output shaft. The actuator assembly includes a housing having at least first, second, and third sections at least partially defining first and second cavities, with the third section between the first and second sections. A motor assembly has a rotatable drive shaft and is coupled to the third section. The motor assembly is at least partially disposed in the first cavity and the drive shaft is at least partially disposed in the second cavity. At least one drive gear is within the second cavity and is fixed to the drive shaft. At least one driven gear is within the second cavity and is coupled with the output shaft. The at least one driven gear is coupled to the third section of the housing and is rotatably coupled with the at least one drive gear to transmit rotation from the drive shaft to the output shaft.

23 Claims, 8 Drawing Sheets

(56) References Cited

U.S. PATENT DOCUMENTS

| | | |
|---|---|---|
| 2009/0155097 A1 | 6/2009 | Winkler |
| 2010/0320880 A1 | 12/2010 | Kamogi |
| 2014/0028161 A1 | 1/2014 | Kamogi |
| 2015/0047553 A1 | 2/2015 | Heinrich et al. |
| 2015/0378153 A1 | 12/2015 | Kodani et al. |
| 2015/0380990 A1 | 12/2015 | Flanary et al. |
| 2015/0381017 A1 | 12/2015 | Kitaji et al. |
| 2016/0056692 A1 | 2/2016 | Suzuki |
| 2016/0079827 A1 | 3/2016 | Kim |
| 2016/0164348 A1 | 6/2016 | Mellere |

\* cited by examiner

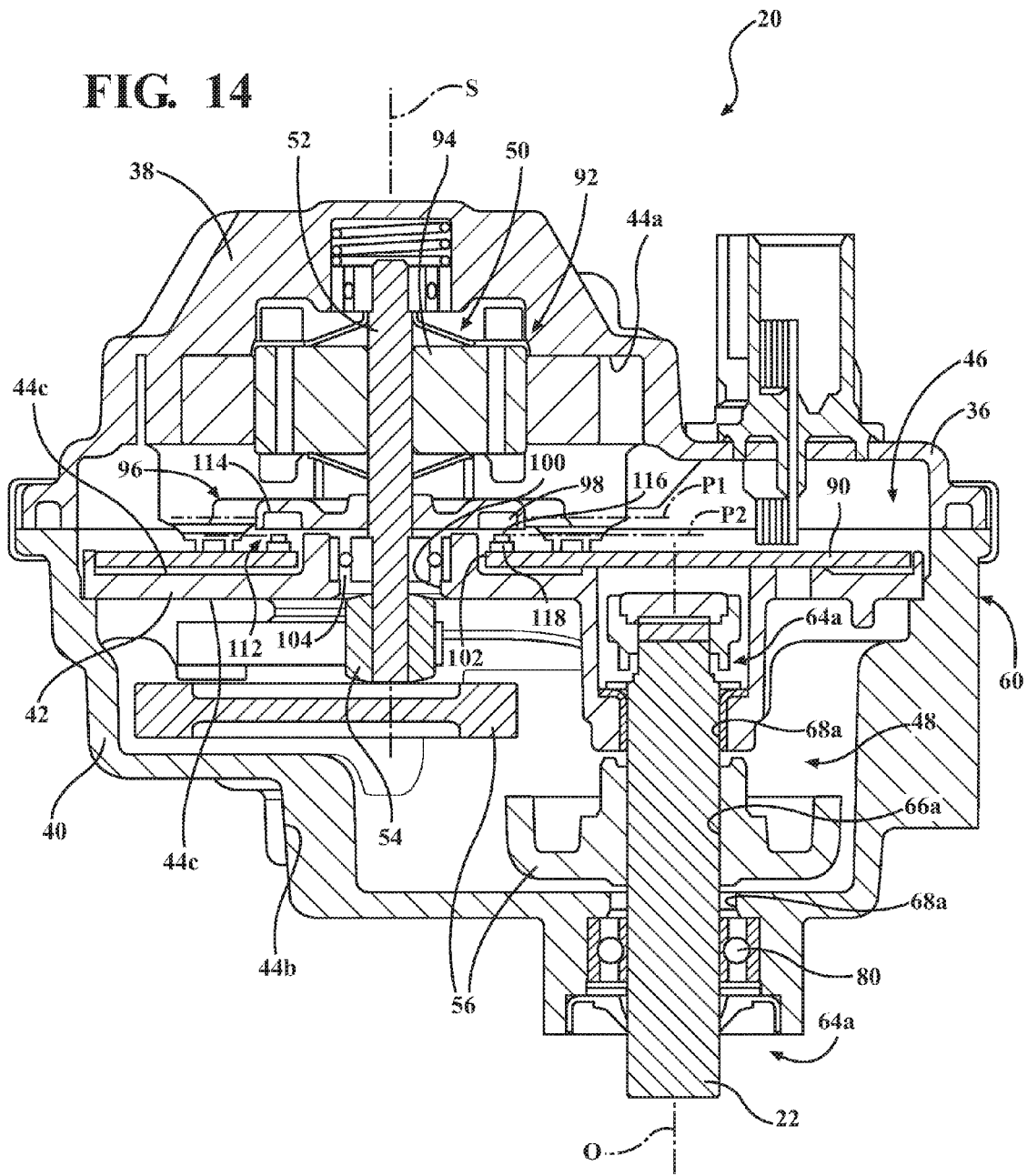

ACTUATOR ASSEMBLY HAVING AT LEAST ONE DRIVEN GEAR COUPLED TO A HOUSING

BACKGROUND OF THE INVENTION

1. Field of the Invention

An actuator assembly for moving an output shaft between a plurality of positions.

2. Description of Related Art

Many fluid flow devices in vehicles, such as a turbochargers and exhaust gas recirculation (EGR) valves, use an actuator assembly to control their functions and performance. For example, certain actuator assemblies may be pneumatic or electric, and may be used to provide positional control of variable vanes of a turbocharger or a valve plate of an EGR valve to adjust and maintain fluid pressure and fluid flow within an intake manifold of an engine. Controlling the fluid pressure and the fluid flow within the intake manifold provides optimum performance while maintaining legislated vehicle emissions.

Traditionally, the actuator assembly includes a housing having first and second sections defining an interior cavity. The actuator assembly further includes a motor and a plurality of gears within the interior cavity. Each of the gears are rotatably supported by a pin pressed into the housing or a shaft pressed into the gear. The pin or the shaft is supported at one end by one of the first and second sections. The other end of the pin or the shaft is unsupported because the motor is positioned between the pin and the other one of the first and second sections. Supporting the pin or the shaft by a single end places a high bending stress on the pin or the shaft and affects the meshing of the gear teeth, which can lead to excessive wear. As such, there remains a need to provide an improved actuator assembly.

SUMMARY OF THE INVENTION AND ADVANTAGES

The subject invention provides for an actuator assembly. The actuator assembly comprises a housing having at least a first section, a second section, and a third section each having an internal surface. The third section is positioned between the first and second sections such that the internal surfaces of the first and third sections at least partially define a first cavity and the internal surfaces of the second and third sections at least partially define a second cavity.

The actuator assembly further comprises a motor assembly having a drive shaft rotatable about a shaft axis and capable of transmitting rotational force with the drive shaft. The motor assembly is at least partially disposed in the first cavity and the drive shaft extends through the third section of the housing such that the drive shaft is at least partially disposed in the second cavity. The motor assembly is coupled to the third section of the housing.

The actuator assembly further comprises at least one drive gear disposed within the second cavity of the housing. The at least one drive gear is fixed to and rotatable with the drive shaft of the motor assembly. The actuator assembly further comprises at least one driven gear disposed within the second cavity of the housing and configured to be rotatably coupled with an output shaft that is moveable between a plurality of positions. The at least one driven gear is coupled to the third section of the housing. The at least one driven gear is rotatably coupled with the at least one drive gear such that the at least one driven gear is capable of transmitting rotation from the drive shaft of the motor assembly to the output shaft for moving the output shaft between the plurality of positions.

Accordingly, the actuator assembly provides the advantage of substantially separating the motor assembly from the at least one drive and driven gears in the first and second cavities, respectively. Separating the motor assembly from the at least one drive and driven gears prevents interfering engagement between the motor assembly and the at least one drive and driven gears, or their supporting pin or shaft, while also providing support to the at least one driven gear proximate the motor assembly.

BRIEF DESCRIPTION OF THE DRAWINGS

Advantages of the subject invention will be readily appreciated as the same becomes better understood by reference to the following detailed description when considered in connection with the accompanying drawings.

FIG. 14 is a cross-sectional view of the actuator assembly taken along 14-14 in FIG. 13, and showing the third section enveloped by the first and second sections.

DETAILED DESCRIPTION OF THE INVENTION

Figure 1:
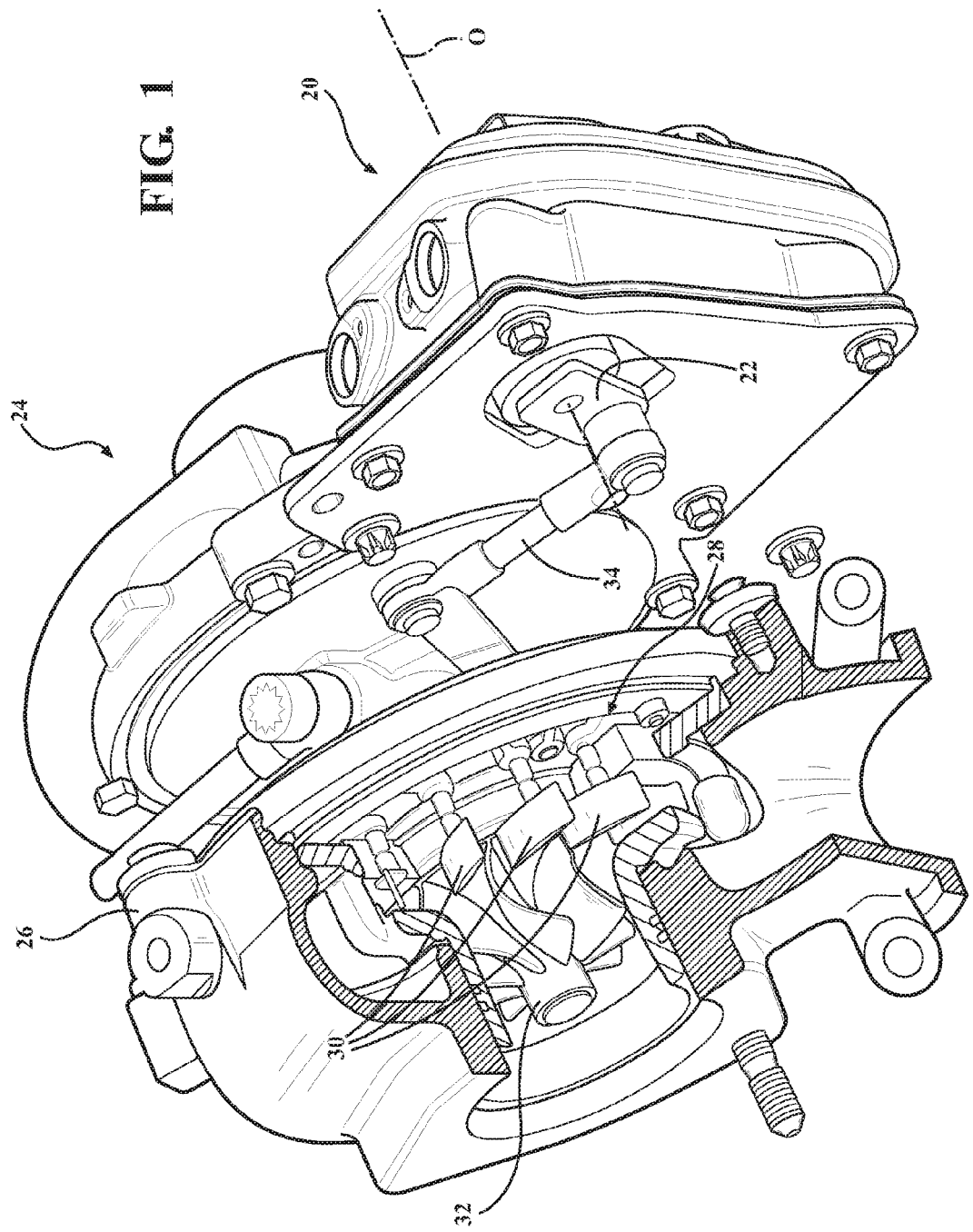
FIG. 1 is a perspective view of an actuated turbocharger system including an actuator assembly and a turbocharger.
Figure 2:
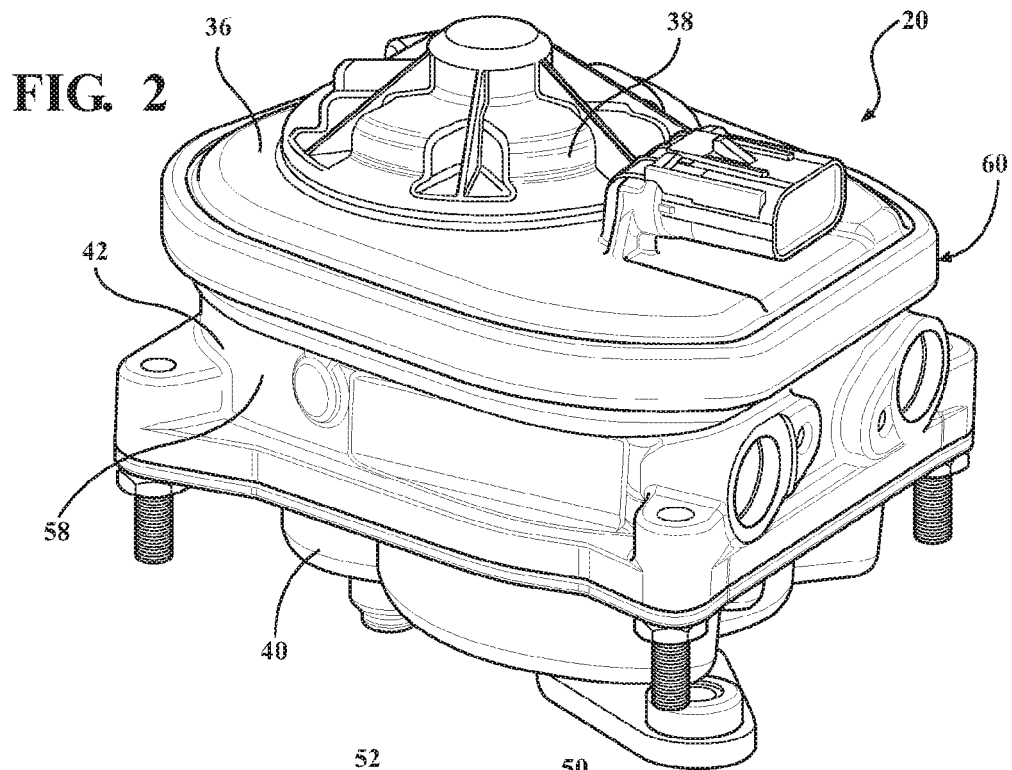
FIG. 2 is a perspective view of the actuator assembly including a housing having first, second, and third sections.

Referring to the Figures, wherein like numerals indicates like or corresponding parts throughout the several views, an actuator assembly 20 is generally shown in FIGS. 1 and 2. The actuator assembly 20 is typically used in a vehicle for moving an output shaft 22 between a plurality of positions.

In one example, the actuator assembly 20 is used with an actuated turbocharger system 24 for use with an engine of the vehicle, as shown in FIG. 1. More specifically, the actuated turbocharger system 24 controls the flow of a fluid to or from the engine. For example, the vehicle may comprise the engine, an intake manifold configured to flow air into the engine, and an exhaust manifold configured to flow exhaust out of the engine.

The actuated turbocharger system 24 comprises a turbocharger 26 for pressurizing air into the engine. The turbocharger 26 is fluidly coupled with each of the intake manifold and the exhaust manifold to increase flow of the air into the engine by way of utilizing the energy of the moving exhaust flowing out of the engine, as is commonly known to those having ordinary skill in the art. The actuated turbocharger system 24 controls the pressure and the flow of the air from the turbocharger 26 into the engine through the intake manifold, which is commonly referred to as boost pressure. The actuated turbocharger system 24 further comprises a pressure control mechanism 28 coupled to the turbocharger 26 and movable between a plurality of states for regulating the pressure of the air produced by the turbocharger 26. The pressure control mechanism 28 may include variable vanes 30 fluidly coupled to a turbine 32 of the turbocharger 26, with the orientation of the variable vanes 30 changing as the pressure control mechanism 28 moves between the plurality of states to alter the flow of the fluid to the turbine 32, which regulate the speed at which the turbine 32 rotates and, in-turn, alters the pressure and the flow of the air from the turbocharger 26 into the intake manifold.

The output shaft 22 is coupled to the pressure control mechanism 28 and is movable between the plurality of positions corresponding with the plurality of states of the pressure control mechanism 28. More specifically, the actuated turbocharger system 24 may include a control shaft 34 coupled to each of the output shaft 22 and the variable vanes 30, with the movement of the output shaft 22 moving the control shaft 34, which changes the orientation of the variable vanes 30.

The output shaft 22 is described herein as a component which is separate from the actuator assembly 20, but operably coupled with the actuator assembly 20. However, one having skill in the art will appreciate that output shaft 22 could be included as a component of the actuator assembly 20.

The vehicle may further comprise an electronic control unit (ECU) and an actuator controller. The ECU may be connected to the actuator controller by a wire harness having multiple conductors and connectors. The actuator controller may also be connected to the actuator assembly 20 by a wire harness having multiple conductors and connectors. The actuator controller may be a separate component. Alternatively, the actuator controller may be integrated within one of the actuator assembly 20 and the ECU.

The ECU may provide an electrical position input signal to the actuator controller that may indicate a desired position of the output shaft 22 as controlled by the actuator assembly 20. The actuator controller may provide the necessary electrical control signal to the actuator assembly 20 to achieve the desired position of the output shaft 22.

The actuator assembly 20 may also provide feedback in the form of an electrical position output signal to the actuator controller. A "closed loop" control scheme may be used to maintain a desired position of the output shaft 22 as controlled by the actuator assembly 20 by comparing the feedback electrical position output signal value to a desired value and may adjust the electrical control signal to the actuator assembly 20 to maintain the resulting position of the output shaft 22 and the resultant fluid flow and boost pressure.

Although the actuator assembly 20 is shown in FIG. 1 controlling the state of the pressure control mechanism 28 of the actuated turbocharger system 24, one having skill in the art will appreciate that the actuator assembly 20 may be used anywhere within automobiles for controlling the flow of a fluid to devices other than the turbocharger system 24. As non-limiting examples, the actuator assembly 20 may be used to control wastegate valves, exhaust throttles, exhaust gas recirculation (EGR) valves, and intake throttles.

As shown in FIGS. 2, 7, 13, and 14, the actuator assembly 20 comprises a housing 36 having at least a first section 38, a second section 40, and a third section 42 each having an internal surface 44. The third section 42 is positioned between the first and second sections 38, 40 such that the internal surfaces 44a, 44c of the first and third sections 38, 42 at least partially define a first cavity 46 and the internal surfaces 44b, 44c of the second and third sections 40, 42 at least partially define a second cavity 48. The first, second, and third sections 38, 40, 42 may be referred to by different names to those having skill in the art. More specifically, the first section 38 may be referred to in the art as a motor housing, the second section 40 may be referred to in the art as an output housing, and the third section may be referred to in the art as an intermediate housing. It is to be appreciated that the first, second, and third sections 38, 40, 42 may be referred to by any suitable name.

Figure 4:
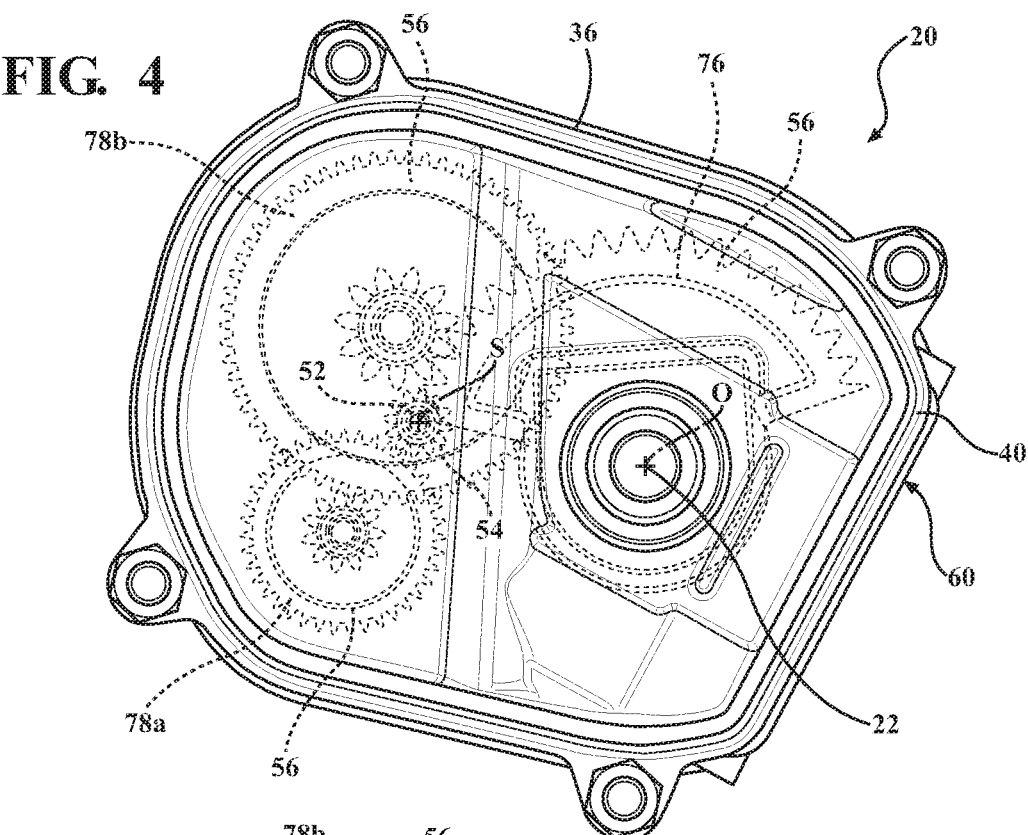
FIG. 4 is a bottom elevational view of the actuator assembly showing at least one drive gear, first and second intermediate gears, and an output gear as hidden.
Figure 5:
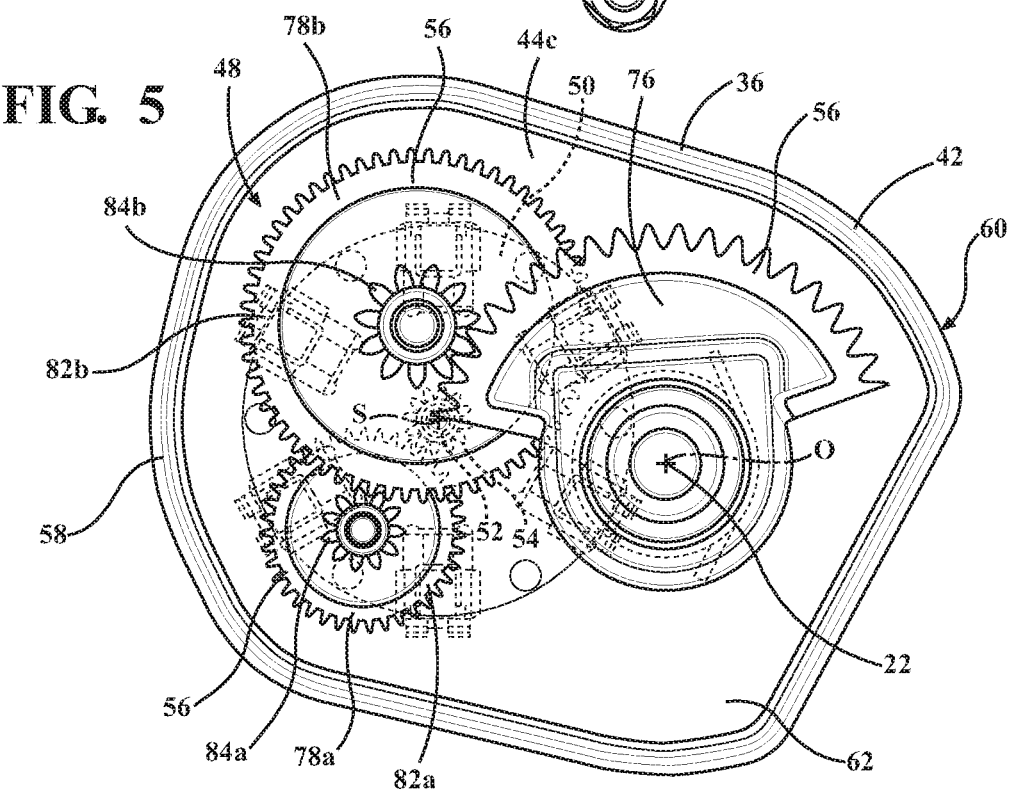
FIG. 5 is a bottom elevational view of the third section of the housing and the at least one drive gear, the first and second intermediate gears, and the output gear as hidden.

As shown in FIGS. 4, 5, and 14, the actuator assembly 20 further comprises a motor assembly 50 having a drive shaft 52 rotatable about a shaft axis S and capable of transmitting rotational force with the drive shaft 52. The motor assembly 50 is at least partially disposed in the first cavity 46 and the drive shaft 52 extends through the third section 42 of the housing 36 such that the drive shaft 52 is at least partially disposed in the second cavity 48. The motor assembly 50 is coupled to the third section 42 of the housing 36.

The actuator assembly 20 further comprises at least one drive gear 54 disposed within the second cavity 48 of the housing 36. The at least one drive gear 54 is fixed to and rotatable with the drive shaft 52 of the motor assembly 50. The actuator assembly 20 further comprises at least one driven gear 56 disposed within the second cavity 48 of the housing 36 and configured to be rotatably coupled with the output shaft 22, which is moveable between the plurality of positions. The at least one driven gear 56 is coupled to the third section 42 of the housing 36. The at least one driven gear 56 is rotatably coupled with the at least one drive gear 54 such that the at least one driven gear 56 is capable of transmitting rotation from the drive shaft 52 of the motor assembly 50 to the output shaft 22 for moving the output shaft 22 between the plurality of positions.

The actuator assembly 20 may produce rotary or linear motion. For illustrative purposes, the actuator assembly 20 shown in the Figures produces rotary motion.

As shown in FIGS. 2, 3, 5, 7, 9, 10, and 11, the third section 42 may have a flange 58 at least partially defining an exterior 60 of the housing 36 and a body 62 extending from the flange 58 and enveloped by the flange 58 and the first and second sections 38, 40 such that the body 62 is entirely disposed within the housing 36. The body 62 may have a substantially planar configuration, with the body 62 of the third section 42 separating the first and second cavities 46, 48. As such, the at least one driven gear 56 may be coupled to the body 62 of the third section 42 of the housing 36. The flange 58 may extend from the body 62 in opposing directions such that the flange 58 and the body 62 of the third section 42 define a portion of the first cavity 46 and a portion of the second cavity 48. More specifically, the flange 58 may extend in opposing directions substantially perpendicular from the body 62. Moreover, the body 62 may define a perimeter, with the flange 58 extending from the body 62 along the perimeter such that the flange 58 continuously surrounds the body 62. The first, second, and third sections 38, 40, 42 may abut one another and may be sealed at the abutment to prevent debris from entering the first and second cavities 46, 48.

Alternatively, the third section 42 of the housing 36 may be enveloped by the first and second sections 38, 40 of the housing 36 such that the third section 42 is entirely disposed within the housing 36, as shown in FIG. 14. As such, the entire third section 42 may have a substantially planar configuration and may separate the first and second cavities 46, 48. The first and second sections 38, 40 may abut one another and may be sealed at the abutment to prevent debris from entering the first and second cavities 46, 48. One having skill in the art will appreciate that the third section 42 may have any suitable shape, size, and configuration.

As shown in FIGS. 7, 9, 11, and 14, the at least one driven gear 56 may be coupled to the second section 40 of the housing 36. As such, the at least one driven gear 56 may be coupled to both the second section 40 and the third section 42 of the housing 36. More specifically, the internal surfaces 44b, 44c of both of the second and third sections 40, 42 of the housing 36 may define a gear retention feature 64 to facilitate coupling of the at least one driven gear 56 with the second and third sections 40, 42 of the housing 36.

As shown in FIGS. 7, 9, 11, and 14, the at least one driven gear 56 may define a hole 66 extending therethrough, with the hole 66 corresponding with the gear retention feature 64 to facilitate coupling of the at least one driven gear 56 with the housing 36. Typically, the hole 66 is concentric with the at least one driven gear 56 such that the hole 66 extends through a center of the at least one driven gear 56. One having skill in the art will appreciate that the hole 66 may be defined anywhere within the at least one driven gear 56.

Each of the second and third sections 40, 42 of the housing 36 may individually define a pocket 68, which may collectively define the gear retention feature 64. More specifically, the internal surfaces 44b, 44c of the second and third sections 40, 42 of the housing 36 may individually define the pocket 68.

Figure 7:
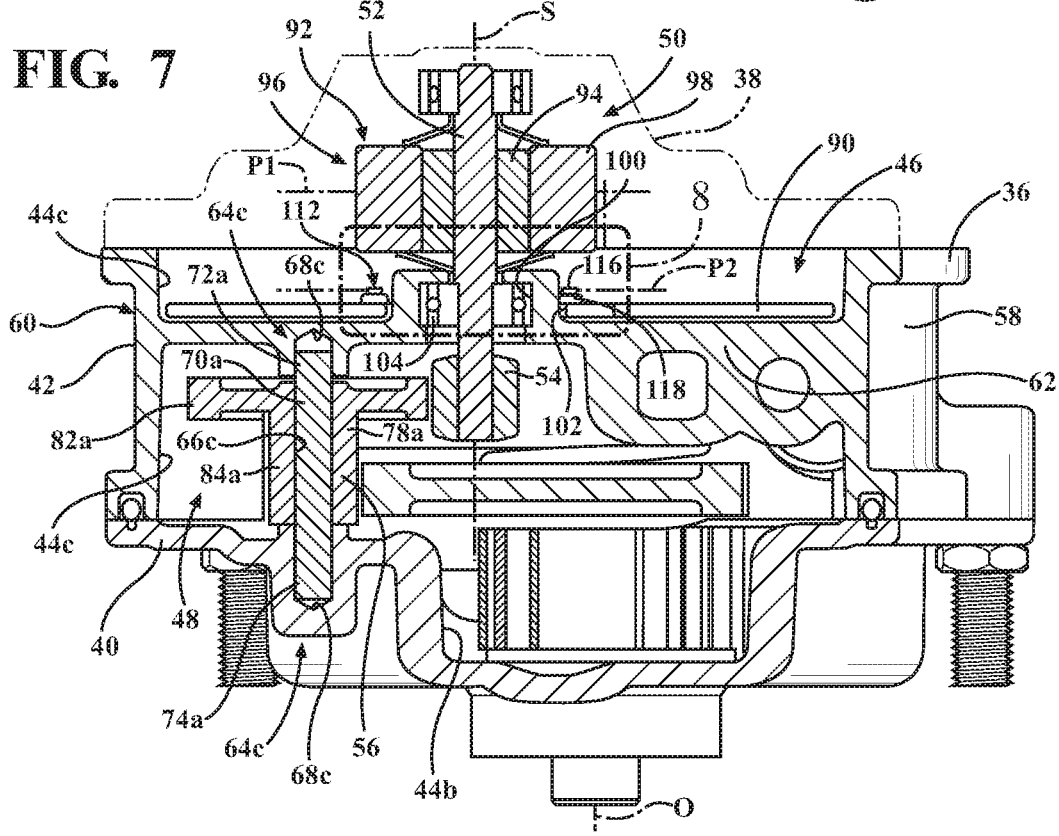
FIG. 7 is a cross-sectional view taken along 7-7 in FIG. 6, showing a magnet group coupled to the rotor and the at least one drive gear engaging the first intermediate gear.
Figure 9:
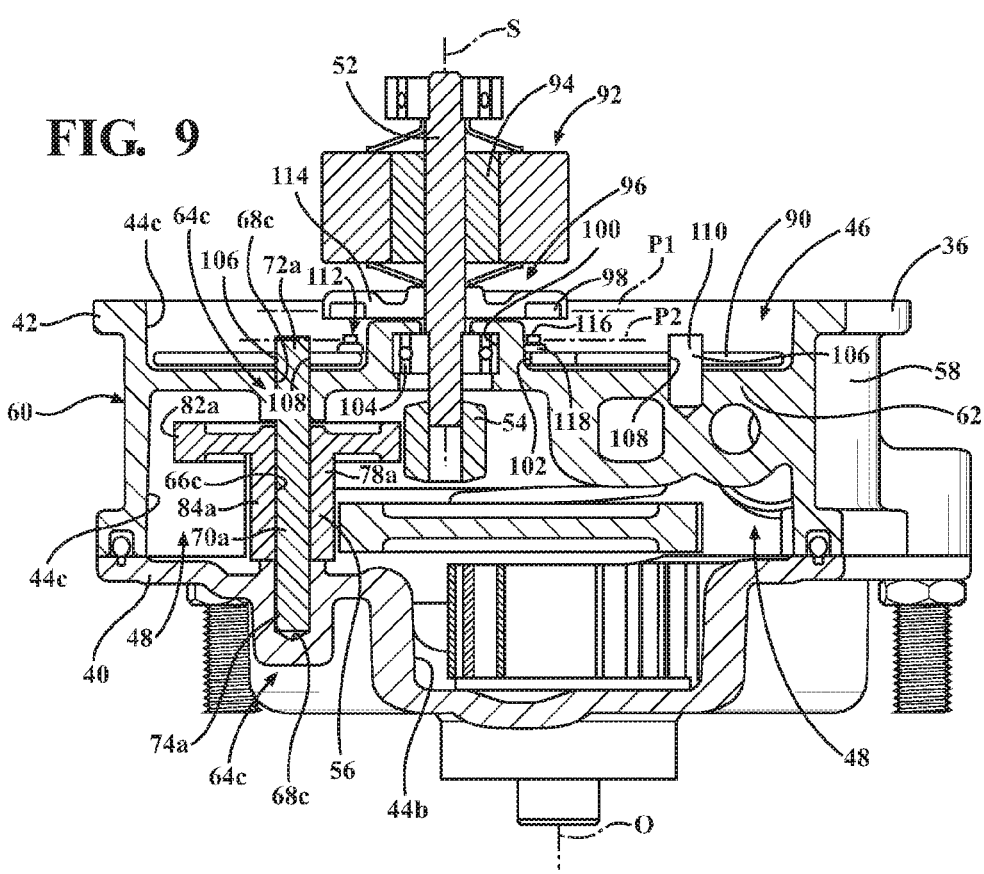
FIG. 9 is a cross-sectional view of the second and third sections of the housing, the at least one drive gear engaging the first intermediate gear, and the magnet group coupled to a drive shaft.
Figure 11:
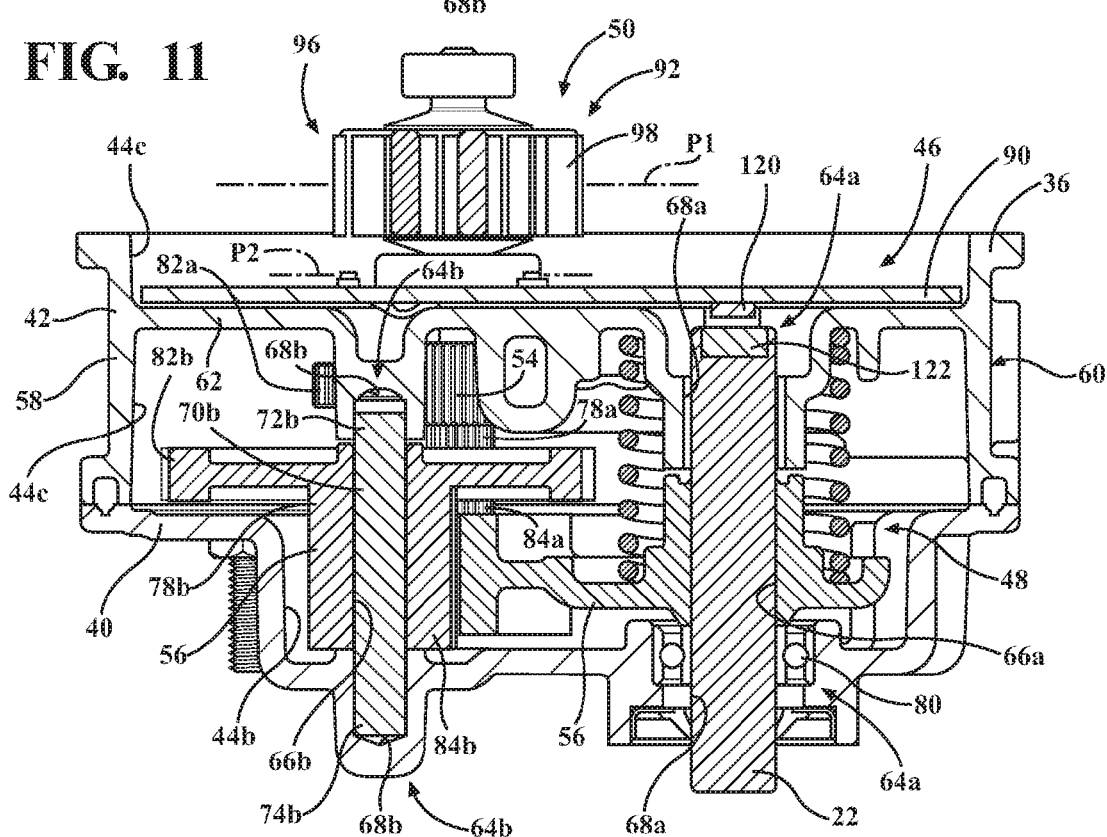
FIG. 11 is a cross-sectional view of the second and third sections of the housing and the second intermediate gear engaging the output gear.

As shown in FIGS. 7, 9, and 11, the actuator assembly 20 may further comprise a gear pin 70 extending between a first end 72 and a second end 74 through the hole 66 of the at least one driven gear 56. The first end 72 of the gear pin 70 may be disposed in the pocket 68 defined by the third section 42 of the housing 36 and the second end 74 of the gear pin 70 may be disposed in the pocket 68 defined by the second section 40 of the housing 36 to facilitate coupling of the pin 70 with the second and third sections 40, 42 of the housing 36, and provide for rotation of the at least one driven gear 56 about the axis of the pin 70. More specifically, each of the pockets 68 may have a cylindrical configuration, with the pockets 68 opening toward one another to receive the gear pin 70 and operably couple the gear pin 70 to the housing 36. The gear pin 70 may have a cylindrical configuration corresponding to the cylindrical configurations of the pockets 68. The cylindrical configuration of the pockets 68 accept the gear pin 70 and retain the gear pin 70 laterally (i.e., each pocket 68 prevents movement of the gear pin 70 in a direction other than toward the other pocket 68).

The coupling of the at least one driven gear 56 with both of the second and third sections 40, 42 provides the advantage of supporting the at least one driven gear 56 on two opposing sides within the second cavity 48 with the motor assembly 50 separated from the at least one driven gear 56 and disposed within the first cavity 46. As such, the at least one driven gear 56 is fully supported by the housing 36 without interfering with the motor assembly 50 (i.e., without engaging the motor assembly 50).

Moreover, supporting the at least one driven gear 56 on two opposing sides reduces a bending stress on the gear pin 70 while maintaining desirable packaging space. Furthermore, the present invention provides for accurate positioning of the at least one driven gear 56 components by locating and aligning the at least one driven gear 56 with the second and third sections 40, 42 of the housing 36 using the gear retention feature 64 of the second and third sections 40, 42.

As shown in FIGS. 7, 9, and 14, the motor assembly 50 has the drive shaft 52 rotatable about the shaft axis S and capable of transmitting rotational force with the drive shaft 52, as described above. The at least one drive gear 54 is fixed to and rotatable with the drive shaft 52 about the shaft axis S. As such, the at least one drive gear 54 is fixed to the drive shaft 52 such that motion of the drive shaft 52 is imparted directly to the at least one drive gear 54. One having skill in the art will appreciate that the at least one drive gear 54 may be coupled to the drive shaft 52 in any suitable way.

The at least one drive gear 54 may have gear teeth extending radially from the drive shaft 52. As shown in FIGS. 4 and 5, the at least one drive gear 54 may have a substantially circular configuration. As such, the at least one drive gear 54 may be referred to as a spur gear. Furthermore, the at least one drive gear 54 may be comparatively smaller than the at least one driven gear 56. As such, the at least one drive gear 54 may be referred to as a pinion gear. One having skill in the art will appreciate that the at least one drive gear 54 may have any suitable gear configuration, such as a bevel gear configuration. As shown in FIGS. 7, 9, and 14, the at least one drive gear 54 is a single drive gear. One having skill in the art will appreciate that the at least one drive gear 54 may be a plurality of drive gears without escaping the scope of the subject invention.

As shown in FIGS. 4, 5, 11, and 14, the at least one driven gear 56 may include an output gear 76 configured to be coupled with the output shaft 22, and at least one intermediate gear 78 engageable with each of the at least one drive gear 54 and the output gear 76 to transmit rotation from the at least one drive gear 54 to the output gear 76.

As shown in FIGS. 11 and 14, the at least one driven gear 56 may be fixed to and rotatable with the output shaft 22. The output shaft 22 may extend through the housing 36 from the cavity along an output axis O. More specifically, the output shaft 22 may extend through the second section 40 of the housing 36. As described above, the housing 36 may define the gear retention feature 64 to facilitate coupling of the at least one driven gear 56 with the second and third sections 40, 42 of the housing 36. Because the at least one driven gear 56 has been further defined as the output gear 76 and the at least one intermediate gear 78, the gear retention feature 64 may be further defined as a plurality of gear retention features 64a, 64b, 64c, with the gear retention features 64a individually corresponding with the output gear 76 and the at least one intermediate gear 78. As such, the description of the gear retention feature 64 described above is applicable to both the output gear 76 and the at least one intermediate gear 78.

The output shaft 22 may be supported by the second and third sections 40, 42 of the housing 36 by the gear retention feature 64*a*. Moreover, the output shaft 22 (rather than the gear pin 70) extends through the hole 66*a* of the output gear 76 and may be disposed in the pockets 68*a* of each of the second and third sections 40, 42. The pocket 68*a* of the second section 40 may be open to the exterior 60 of the housing 36 such that the output shaft 22 may extend outside of the second cavity 48 of the housing 36. At least one of the pockets 68*a* of the second and third sections 40, 42 may include a bearing 80, which allows the output shaft 22 to rotate about the output axis O. The rotation of the at output gear 76 may rotate the output shaft 22 between the plurality of positions.

The output gear 76 may have gear teeth extending radially, as shown in FIGS. 4 and 5. The output gear 76 may have a partially circular configuration. As such, the output gear 76 may be referred to as a partial spur gear. Furthermore, the output gear 76 may be referred to as a sector gear. One having skill in the art will appreciate that the output gear 76 may have any suitable gear configuration, such as a complete spur gear or a bevel gear configuration.

As shown in FIGS. 4, 5, and 11, the at least one intermediate gear 78 may have a first gear section 82 and a second gear section 84 spaced from and fixed to the first gear section 82, with the first gear section 82 being engageable with the at least one drive gear 54 and the second gear section 84 being engageable with the output gear 76. More specifically, the at least one intermediate gear 78 may include a first intermediate gear 78*a* and a second intermediate gear 78*b* with each of the first and second intermediate gears 78*a*, 78*b* having the first and second gear sections 82*a*, 82*b*, 84*a*, 84*b*. Both of the first and second gear sections 82*a*, 82*b*, 84*a*, 84*b* of both of the first and second intermediate gears 78*a*, 78*b* may have gear teeth extending radially. Both of the first and second gear sections 82*a*, 82*b*, 84*a*, 84*b* of both of the first and second intermediate gears 78*a*, 78*b* may have a substantially circular configuration. As such, both of the first and second intermediate gears 78*a*, 78*b* may be referred to as two spur gears. In addition, the first and second gear sections 82*a*, 82*b*, 84*a*, 84*b* of the respective first and second intermediate gears 78*a*, 78*b* may be fixed to one another such that the first and second gear sections 82*a*, 82*b*, 84*a*, 84*b* rotate in unison. As such, each of the first and second intermediate gears 78*a*, 78*b* may be referred to as a compound gear. One having skill in the art will appreciate that the first and second intermediate gears 78*a*, 78*b* may have any suitable gear configuration, such as a bevel gear configuration.

Figure 10:
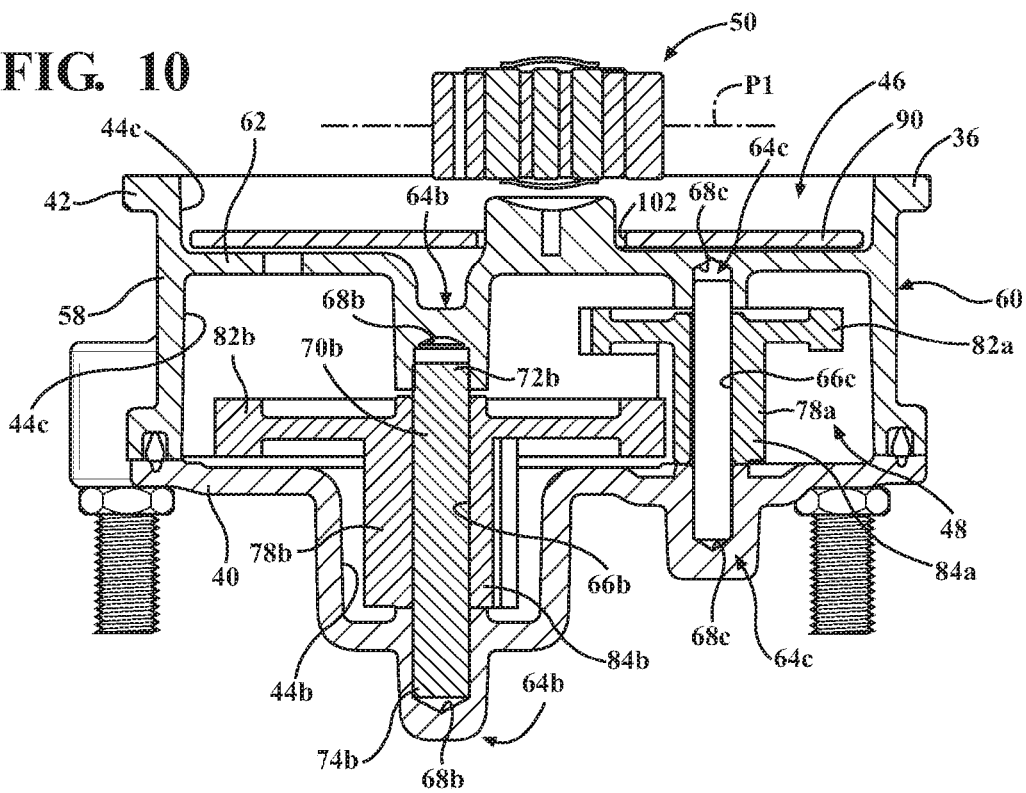
FIG. 10 is a cross-sectional view taken along 10-10 in FIG. 6, showing the first intermediate gear engaging the second intermediate gear.

The first gear section 82*a* of the first intermediate gear 78*a* may be engageable with the at least one drive gear 54, as shown in FIGS. 5, 7, and 9. More specifically, the gear teeth of the first gear section 82*a* of the first intermediate gear 78*a* may be engageable with the gear teeth of the at least one drive gear 54 to define a first gear stage. The second gear section 84*a* of the first intermediate gear 78*a* may be engageable with the first gear section 82*b* of the second intermediate gear 78*b*, as shown in FIGS. 5 and 10. More specifically, the gear teeth of the second gear section 84*a* of the first intermediate gear 78*a* may be engageable with the gear teeth of the first gear section 82*b* of the second intermediate gear 78*b* to define a second gear stage. The second gear section 84*b* of the second intermediate gear 78*b* may be engageable with the output gear 76, as shown in FIGS. 5 and 11. More specifically, the gear teeth of the second gear section 84*b* of the second intermediate gear 78*b* may be engageable with the gear teeth of the output gear 76 to define a third gear stage. One having skill in the art will appreciate that the at least one intermediate gear 78 may include a single intermediate gear 78 which would define only a first and second gear stage. Furthermore, the at least one intermediate gear 78 may be any number of intermediate gears 78 defining any number of gear stages.

As described above, the description of the gear retention feature 64 is applicable to the at least one intermediate gear 78. Moreover, the description of the gear retention feature 64 is applicable both of the first and second intermediate gears 78*a*, 78*b*.

As shown in FIGS. 9-11, each of the first and second intermediate gears 78*a*, 78*b* may respectively define the hole 66*b*, 66*c* extending therethrough, with the hole 66*b*, 66*c* corresponding with the respective gear retention feature 64*b*, 64*c* for each of the first and second intermediate gears 78*a*, 78*b* to facilitate coupling of the at least one driven gear 56 with the housing 36. Each of the second and third sections 40, 42 of the housing 36 may define the pockets 68*b*, 68*c* for each of the first and second intermediate gears 78*a*, 78*b*.

The gear pin 70 described above may be a plurality of gear pins 70*a*, 70*b* individually corresponding with the holes 66*b*, 66*c* of the first and second intermediate gears 78*a*, 78*b*. Each of the gear pins 70*a*, 70*b* extend through the respective hole 66*b*, 66*c* of each of the first and second intermediate gears 78*a*, 78*b*. The first end 72*a*, 72*b* of each of the gear pins 70*a*, 70*b* may be disposed in the respective pocket 68*b*, 68*c* defined by the third section 42 of the housing 36 and the second end 74*a*, 74*b* of each of the gear pins 70*a*, 70*b* may be disposed in the respective pocket 68*b*, 68*c* defined by the second section 40 of the housing 36 to facilitate rotatable coupling of each of the first and second intermediate gears 78*a*, 78*b* with the second and third sections 40, 42 of the housing 36.

Each of the at least one drive gear 54 and the at least one driven gear 56 may be substantially parallel, as shown in FIGS. 7, 9-11, and 14. More specifically, the gear pins 70*a*, 70*b* of the first and second intermediate gears 78*a*, 78*b*, the drive shaft 52 to which the drive gear 54 may be coupled, and the output shaft 22 to which the output gear 76 may be coupled may all be substantially parallel. One having skill in the art will appreciate that the gear pins 70*a*, 70*b* may be transverse to one another.

The operation of transmitting rotation from the motor assembly 50 to the output shaft 22 in accordance with the embodiment shown in the Figures is described below for illustrative purposes. One having skill in the art will appreciate that, although not expressly recited herein, numerous operations are possible in accordance with the present invention.

When the motor assembly 50 is activated, the motor assembly 50 rotates the drive shaft 52 about the shaft axis S. The drive shaft 52 is coupled to the at least one drive gear 54, which causes the at least one drive gear 54 to rotate. The at least one drive gear 54 engages the first gear section 82*a* of the first intermediate gear 78*a* at the first stage, which causes the first intermediate gear 78*a* to rotate. The first gear section 82*a* and the second gear section 84*a* of the first intermediate gear 78*a* are fixed to one another. As such, rotation of the first gear section 82*a* results in simultaneous rotation of the second gear section 84*a*.

The second gear section 84*a* of the first intermediate gear 78*a* engages the first gear section 82*b* of the second intermediate gear 78*b* at the second stage, which causes the second intermediate gear 78b to rotate. The first gear section 82b and the second gear section 84b of the second intermediate gear 78b are fixed to one another. As such, rotation of the first gear section 82b results in simultaneous rotation of the second gear section 84b. The second gear section 84b of the second intermediate gear 78b engages the output gear 76 at the third stage, which causes the output gear 76 to rotate. The output gear 76 is coupled to the output shaft 22, which causes the output shaft 22 to rotate about the output axis O between the plurality of positions.

Figure 3:
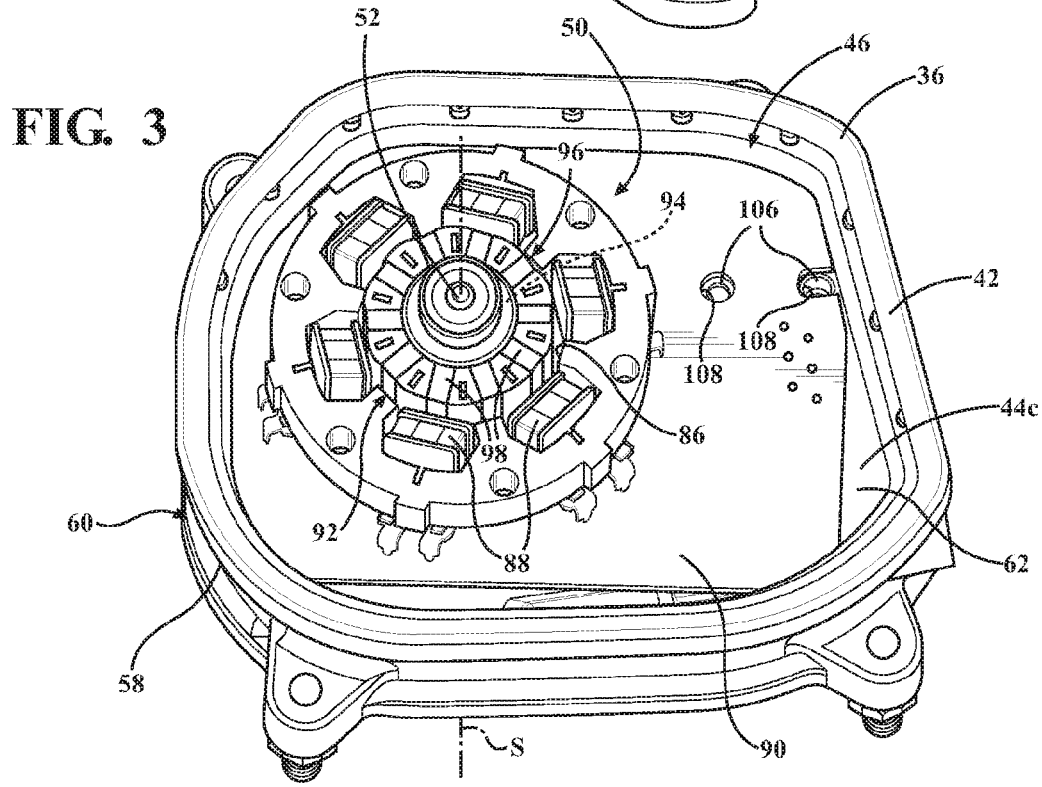
FIG. 3 is a perspective view of the second and third sections of the housing and showing a motor assembly of the actuator assembly.

As described above, the actuator assembly 20 comprises the motor assembly 50, as shown in FIGS. 3 and 5. The motor assembly 50 may comprise a direct current (D.C.) motor. More specifically, as shown in the Figures, the motor assembly 50 may comprise a brushless D.C. motor. The D.C. motor may include brushes to produce motion. One having skill in the art will appreciate that the motor assembly 50 may comprise a stepper motor or any other suitable electrical device. The motor assembly 50 may be configured to be controlled by an electrical control signal. More specifically, at least one of the ECU and the actuator controller control the motor assembly 50 (and, moreover, the actuator assembly 20) by the electrical control signal. One having skill in the art will appreciate that the motor assembly 50 and the actuator assembly 20 may be controlled by any suitable means, such as a mechanical switch.

The motor assembly 50 may comprise a stator disposed in the first cavity 46 of the housing 36 and having a number of teeth shaped radially inward and defining an opening 86, which is substantially cylindrical. A plurality of coils 88 may be mounted to the stator on alternating teeth and may be connected to a primary circuit board 90. A rotor 92 may be disposed within the opening 86 and may be coupled to the drive shaft 52. The rotor 92 may comprise a hub 94 having a substantially cylindrical configuration about the shaft axis S, with a single magnet group 96 coupled to the hub 94 and disposed radially about the shaft axis S on a magnet plane P1, as shown in FIGS. 7, 9, 11, and 14. The magnet plane P1 may be transverse to the shaft axis S. More specifically, the magnet plane P1 may be substantially perpendicular to the shaft axis S. One having skill in the art will appreciate that the magnet plane P1 may be disposed at any suitable angle relative to the shaft axis S.

As shown in the FIGS. 3 and 5, the single magnet group 96 may comprise a plurality of permanent magnets 98. One having skill in the art will appreciate that the single magnet group 96 may comprise a single permanent magnet 98.

Figure 8:
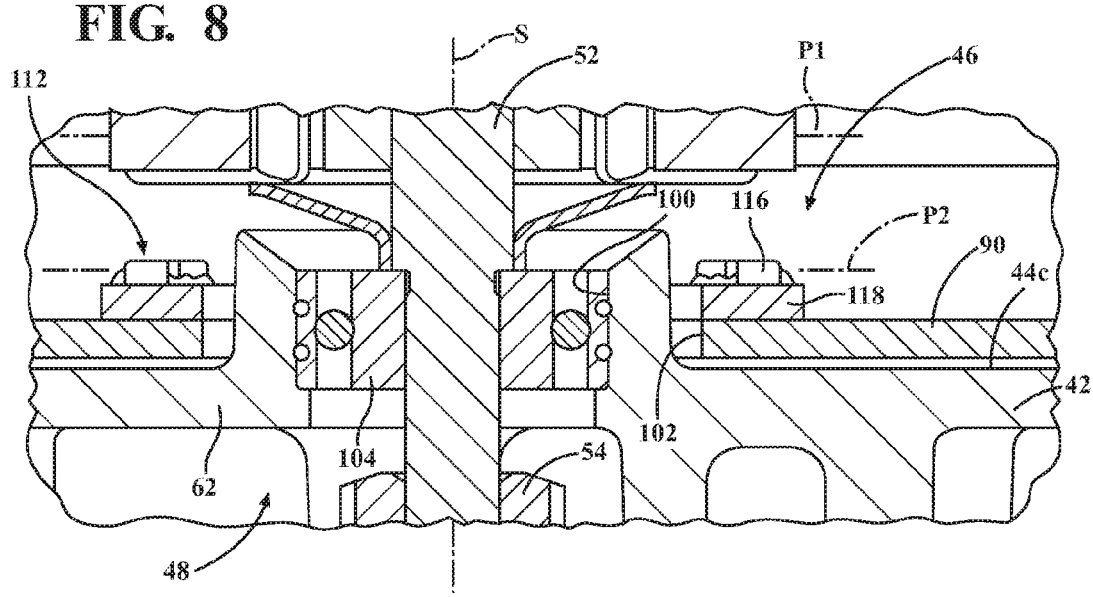
FIG. 8 is a cross-sectional view of a portion of actuator assembly and showing a primary circuit board, a secondary circuit board, and a sensor group.

As shown in FIG. 8, the third section 42 of the housing 36 may define an aperture 100 between the first and second cavities 46, 48 and aligned with the shaft axis S. Moreover, the primary circuit board 90 may define a hole 102 aligned with the shaft axis S and the aperture 100 of the third section 42. The drive shaft 52 may extend through the hole 102 and the aperture 100 to partially dispose the drive shaft 52 in each of the first and second cavities 46, 48. A bearing 104 may support the drive shaft 52 within the aperture 100 while allowing rotation of the drive shaft 52 about the shaft axis S.

Figure 6:
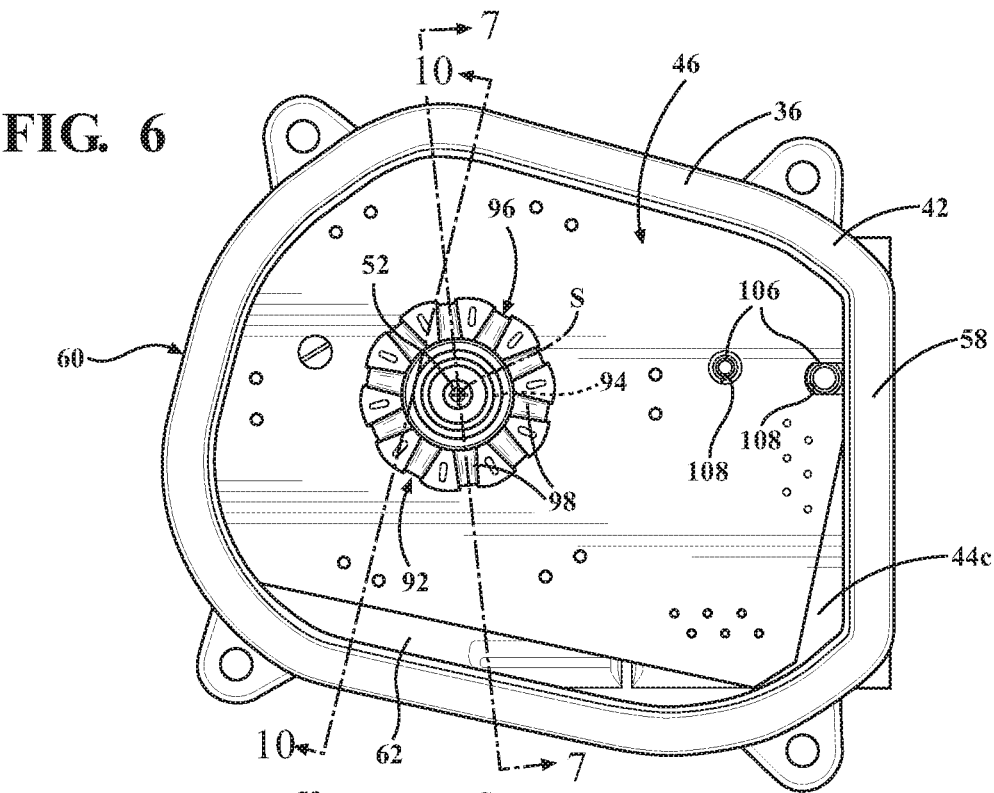
FIG. 6 is a top elevational view of the third section of the housing and showing a rotor of the motor assembly.

As described above, the motor assembly 50 may include the primary circuit board 90, as shown in FIGS. 3 and 6. The primary circuit board 90 may be configured to control electrical distribution within the motor assembly 50. For example, the primary circuit board 90 may be electrically coupled with the coils 88 with the primary circuit board 90 controlling electrical distribution to the coils 88 to control the rotation of the drive shaft 52 of the motor assembly 50. The distribution of electricity from the primary circuit board 90 to the coils 88 may commutate the motor assembly 50. More specifically, the motor assembly 50 may be commutated by continuously switching the electrical control signal to the coils 88 to provide an electromagnetic field that may cause rotation of the rotor 92 and the drive shaft 52. By rotating the drive shaft 52, the output shaft 22 (as well as the first and second intermediate gears 78a, 78b) is rotated between the plurality of positions in accordance with the description above.

As described above, the motor assembly 50 is coupled to the third section 42 of the housing 36. More specifically, the primary circuit board 90 may be disposed within the first cavity 46 and may be coupled to the third section 42 of the housing 36. As shown in FIGS. 7-11 and 14, the primary circuit board 90 may be substantially planar and may lie along the third section 42. Furthermore, the primary circuit board 90 may be fixed to the housing 36. As shown in the Figures, the primary circuit board 90 may directly abut the third section 42. One having skill in the art will appreciate that the primary circuit board 90 may be spaced from the third section 42, but may still coupled to the third section 42, for example, by way of a shim or adhesive disposed between the primary circuit board 90 and the third section 42.

As shown in FIGS. 5, 6, and 9, the third section 42 may have at least one stud 106 extending into the first cavity 46, with the primary circuit board 90 defining a recess 108 for receiving the stud 106 such that the stud 106 and the recess 108 position the primary circuit board 90 within the first cavity 46 and fix the primary circuit board 90 to the third section 42. The at least one stud 106 may be substantially perpendicular to the primary circuit board 90. The at least one stud 106 may extend into the first cavity 46 at any suitable angle. The recess 108 may be configured and sized to receive the stud 106 and to couple and align the primary circuit board 90 to the third section 42 of the housing 36. The at least one stud 106 may be integral with the third section 42, as shown in FIGS. 3 and 6. More specifically, the at least one stud 106 may be comprised of molded plastic. Alternatively, the actuator assembly 20 may further comprise a support pin 110 as the at least one stud 106, with the support pin 110 coupled to the third section 42 and extending into the first cavity 46, as shown in FIG. 9. Furthermore, the actuator assembly 20 may further comprise the gear pin 70 extending through the third section 42 of the housing 36 as the at least one stud 106, with the gear pin 70 extending into the first cavity 46, as also shown in FIG. 9.

The third section 42 of the housing 36 may be comprised of a metallic material, with the coupling of the motor assembly 50 with the third section 42 providing a heat sink for the motor assembly 50 through the third section 42. More specifically, the primary circuit board 90 may produce a level of heat while distributing the electricity, as described above. The third section 42 coupled to the primary circuit board 90 may provide a heat sink to transfer heat from the primary circuit board 90 to the third section 42, thereby cooling the primary circuit board 90. Moreover, the third section 42 may transfer heat to the exterior 60 of the housing 36, thereby cooling the actuator assembly 20 as a whole. The metallic material of the third section 42 may be aluminum. One having skill in the art will appreciate that the third section 42 may be comprised of any other thermally conductive material. One having skill in the art will also appreciate that a thermally conductive insulator may be used to electrically insulate the primary circuit board 90 from the third section 42.

As shown in FIGS. 7-9, 11, and 14, the motor assembly 50 may include a single sensor group 112 operatively coupled to the primary circuit board 90 and the single magnet group 96 spaced from the single sensor group 112 and fixed to the drive shaft 52, with the single sensor group 112 detecting the position of the single magnet group 96 and the drive shaft 52 to control rotation of the drive shaft 52. As described above, the single magnet group 96 may be coupled to the rotor 92, which is fixed to the drive shaft 52. Alternatively, the single magnet group 96 may be separate from the rotor 92. For example, FIGS. 9 and 14 shows the single magnet group 96 separate and spaced from the rotor 92. The single magnet group 96 may be fixed to the drive shaft 52 by an overmold 114. The single magnet group 96 and the overmold 114 may have a substantially annular configuration about the shaft axis S. The single magnet group 96 and the overmold 114 may have any suitable shape and configuration. As described above, the single magnet group 96 may comprise a single permanent magnet 98 or a plurality of permanent magnets 98. Moreover, the single magnet group 96 may be a single permanent magnet 98 that is segmented to have several alternating magnetic poles.

As shown in FIG. 8, the single sensor group 112 may be disposed radially about the shaft axis S on a sensor plane P2. The sensor plane P2 may be transverse to the shaft axis S. More specifically, the sensor plane P2 may be substantially perpendicular to the shaft axis S. Moreover, the sensor plane P2 may be substantially parallel to the magnet plane P1. One having skill in the art will appreciate that the sensor plane P2 may be disposed at any suitable angle relative to the shaft axis S.

The single sensor group 112 may comprise a plurality of sensors 116. Alternatively, one having skill in the art will appreciate that the single sensor group 112 may comprise a single sensor 116. As a non-limiting examples, the single sensor group 112 may comprise one of a Hall Effect Device (HED), an inductive sensor, a magneto-resistive sensor for sensing a change in the magnetic field of the single magnet group 96 as the single magnet group 96 rotates with the drive shaft 52.

As shown in FIGS. 7, 9, and 14, the single sensor group 112 is located in proximity of the single sensor group 112 to sense the change of the magnetic field of the single magnet group 96. As shown in FIG. 8, the motor assembly 50 may include a secondary circuit board 118 fixed to and electrically coupled with the primary circuit board 90, with the single sensor group 112 positioned on the secondary circuit board 118. The secondary circuit board 118 may be positioned between the primary circuit board 90 and the single magnet group 96 to locate the single sensor group 112 in proximity with the single magnet group 96. The secondary circuit board 118 and the single sensor group 112 may at least partially encircle the drive shaft 52. One having skill in the art will appreciate that the secondary circuit board 118 may have any suitable shape and configuration about the drive shaft 52.

The secondary circuit board 118 provides a direct electrical coupling between the single sensor group 112 and the primary circuit board 90. More specifically, the secondary circuit board 118 is electrically coupled with both the primary circuit board 90 and the single sensor group 112 with electric signals transmitted between the primary circuit board 90 and the single sensor group 112 through the secondary circuit board 118. Furthermore, the single sensor group 112 lies along, and is fixed to, the secondary circuit board 118 and the secondary circuit board 118 lies along, and is fixed to, the primary circuit board 90. As such, the single sensor group 112 is fixed to and supported by the primary circuit board 90, which removes the need to separately support the single sensor group 112, spaced from the primary circuit board 90, in order to place the single sensor group 112 in proximity of the single magnet group 96.

The primary circuit board 90 may provide an electrical control signal to at least one of the coils 88, which may produce an electromagnetic field that will attract or repel the single magnet group 96 located on the rotor 92, which may cause the rotor 92 and the drive shaft 52 to rotate. The single sensor group 112 may detect a change in the magnetic field of the single magnet group 96. When a sufficient change in the magnetic field is detected, the primary circuit board 90 may switch the electrical control signal to another of one of the coils 88 to sustain rotation of the rotor 92 and the drive shaft 52.

Figure 12:
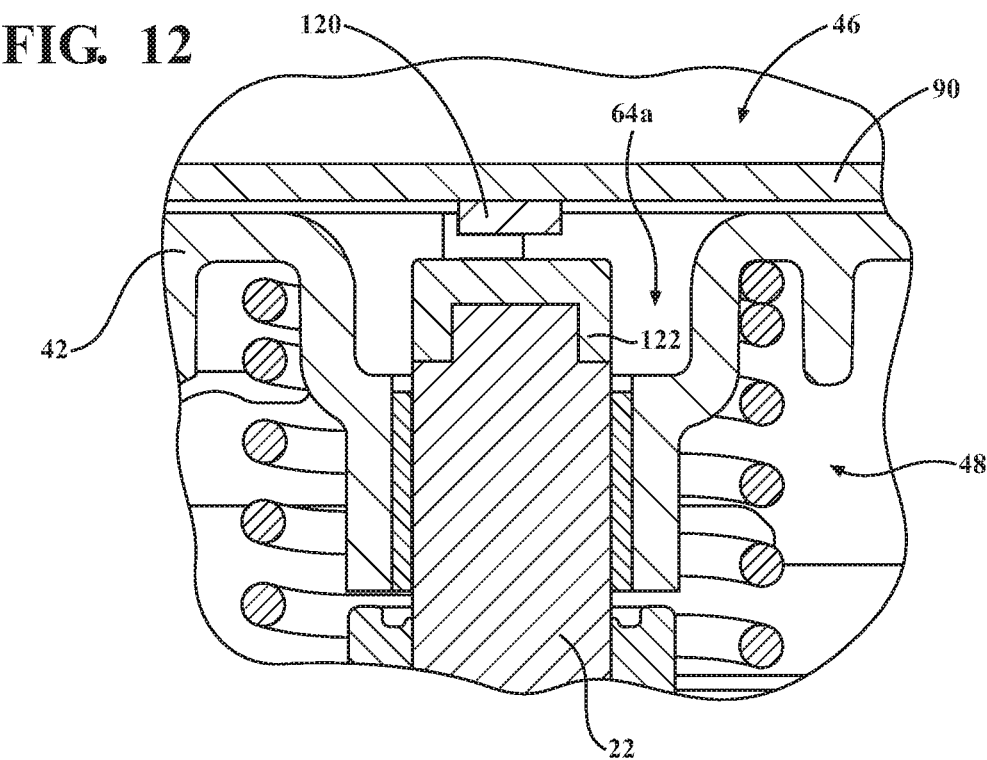
FIG. 12 is a cross-sectional view of a portion of actuator assembly and showing an output shaft sensor coupled to the primary circuit board and an output shaft magnet coupled to the output shaft.
Figure 13:
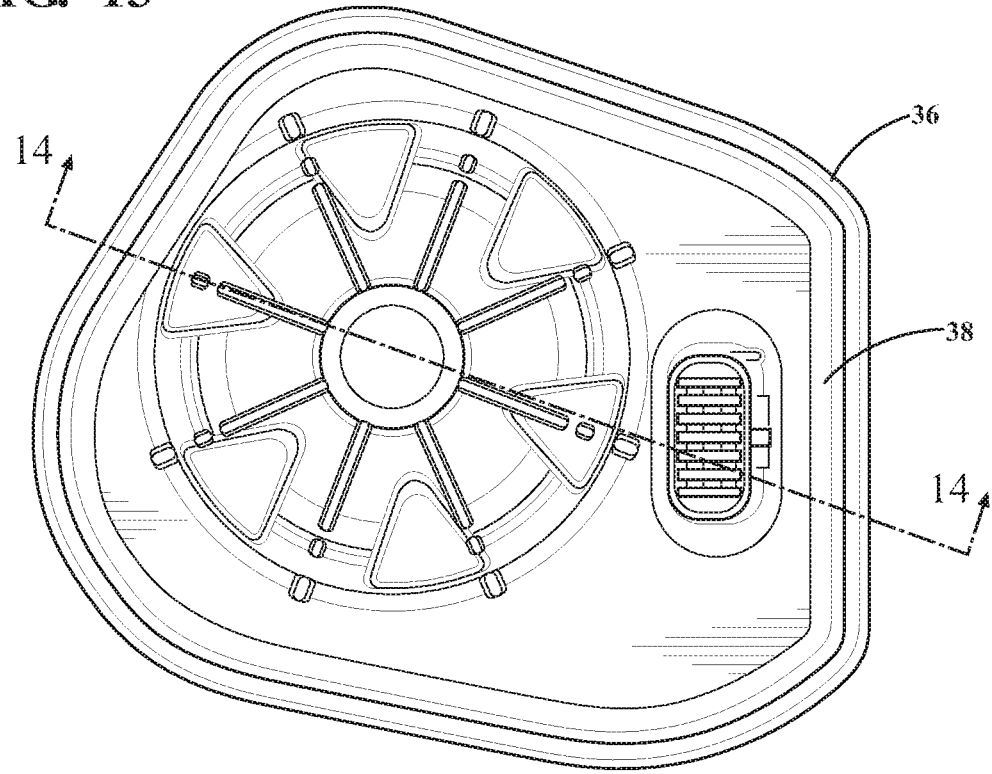
FIG. 13 is a top elevational view of an actuator assembly having the third section enveloped by the first and second sections.

As shown in FIGS. 11, 12, and 14, the actuator assembly 20 may further comprise an output shaft sensor 120 and an output shaft magnet 122 for sensing the rotational position of the output shaft 22. The output shaft sensor 120 may be fixed to, and electrically coupled with the primary circuit board 90 while the output shaft magnet 122 may be coupled to a distal end of the output shaft 22, adjacent the primary circuit board 90. One having skill in the art will appreciate that the opposite may be true (i.e., the output shaft magnet 122 may be coupled to the primary circuit board 90 and the output shaft sensor 120 may be coupled to the output shaft 22). The output shaft magnet 122 may be coupled to the output shaft 22 by over molding (as shown in FIGS. 11, 12, and 14), adhesive, snap fit, or any other suitable manner. As non-limiting examples, the output shaft sensor 120 may comprise one of a Hall Effect Device (HED), an inductive sensor, a magneto-resistive sensor for sensing a change in the magnetic field of the output shaft magnet 122 as the output shaft magnet 122 rotates with the output shaft 22.

Another example of an actuator assembly is disclosed in U.S. patent application Ser. No. 15/492,114, entitled "Circuit Board Assembly Having A Secondary Circuit Board Abutting A Primary Circuit Board, With At Least One Sensor Disposed On The Secondary Circuit Board," filed on Apr. 20, 2017, the disclosure of which is hereby incorporated by reference in its entirety.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An actuator assembly comprising:
   a housing having at least a first section, a second section, and a third section each having an internal surface, with said third section positioned between said first and second sections such that said internal surfaces of said first and third sections at least partially define a first cavity and said internal surfaces of said second and third sections at least partially define a second cavity;
   a motor assembly having a drive shaft rotatable about a shaft axis and capable of transmitting rotational force with said drive shaft, with said motor assembly at least partially disposed in said first cavity and said drive shaft extending through said third section of said housing such that said drive shaft is at least partially disposed in said second cavity, and with said motor assembly coupled to said third section of said housing;

at least one drive gear disposed within said second cavity of said housing, with said at least one drive gear fixed to and rotatable with said drive shaft of said motor assembly; and at least one driven gear disposed within said second cavity of said housing and configured to be rotatably coupled with an output shaft that is moveable between a plurality of positions, with said at least one driven gear directly coupled to said third section of said housing, and with said at least one driven gear rotatably coupled with said at least one drive gear such that said at least one driven gear is capable of transmitting rotation from said drive shaft of said motor assembly to the output shaft for moving the output shaft between the plurality of positions.

2. The actuator assembly as set forth in claim 1, wherein said at least one driven gear is coupled to said second section of said housing.

3. The actuator assembly as set forth in claim 2, wherein said internal surfaces of both of said second and third sections of said housing define a gear retention feature to facilitate coupling of said at least one driven gear with said second and third sections of said housing.

4. The actuator assembly as set forth in claim 3, wherein said at least one driven gear defines a hole extending therethrough, with said hole corresponding with said gear retention feature to facilitate coupling of said at least one driven gear with said housing.

5. The actuator assembly as set forth in claim 4, wherein each of said second and third sections of said housing individually define a pocket which collectively define said gear retention feature.

6. The actuator assembly as set forth in claim 5, further comprising a gear pin extending between a first end and a second end through said hole of said at least one driven gear, with said first end disposed in said pocket defined by said third section of said housing and said second end disposed in said pocket defined by said second section of said housing to facilitate rotatable coupling of said at least one driven gear with said second and third sections of said housing.

7. The actuator assembly as set forth in claim 6, wherein each of said pockets has a cylindrical configuration, with said pockets opening toward one another to receive said gear pin and operably couple said gear pin to said housing.

8. The actuator assembly as set forth in claim 1, wherein said third section has a flange at least partially defining an exterior of said housing and a body extending from said flange and enveloped by said flange and said first and second sections such that said body is entirely disposed within said housing.

9. The actuator assembly as set forth in claim 8, wherein said at least one driven gear is coupled to said body of said third section of said housing.

10. The actuator assembly as set forth in claim 9, wherein said flange extends from said body in opposing directions such that said flange and said body of said third section define a portion of said first cavity and a portion of said second cavity.

11. The actuator assembly as set forth in claim 1, wherein said third section of said housing is enveloped by said first and second sections of said housing such that said third section is entirely disposed within said housing.

12. The actuator assembly as set forth in claim 1, wherein said at least one driven gear includes an output gear configured to be coupled with the output shaft, and at least one intermediate gear engageable with each of said at least one drive gear and said output gear to transmit rotation from said at least one drive gear to said output gear.

13. The actuator assembly as set forth in claim 12, wherein said at least one intermediate gear has a first gear section and a second gear section spaced from and fixed to said first gear section, with said first gear section being engageable with said at least one drive gear and said second gear section being engageable with said output gear.

14. The actuator assembly as set forth in claim 1, wherein said motor assembly includes a primary circuit board configured to control electrical distribution within said motor assembly, with said primary circuit board disposed within said first cavity and coupled to said third section of said housing.

15. The actuator assembly as set forth in claim 14, wherein said primary circuit board is fixed to said housing.

16. The actuator assembly as set forth in claim 15, wherein said third section has at least one stud extending into said first cavity, with said primary circuit board defining a recess for receiving said stud such that said stud and said recess position said primary circuit board within said first cavity and fix said primary circuit board to said third section.

17. The actuator assembly as set forth in claim 14, wherein said motor assembly includes a single sensor group operatively coupled to said primary circuit board and a single magnet group spaced from said single sensor group and fixed to said drive shaft, with said single sensor group detecting the position of said single sensor group and said drive shaft to control rotation of said drive shaft.

18. The actuator assembly as set forth in claim 17, wherein said motor assembly includes a secondary circuit board fixed to and electrically coupled with said primary circuit board, with said single sensor group positioned on said secondary circuit board.

19. The actuator assembly as set forth in claim 18, wherein said secondary circuit board is positioned between said primary circuit board and said single magnet group to locate said single sensor group in proximity with said single magnet group.

20. The actuator assembly as set forth in claim 19, wherein said secondary circuit board and said single sensor group at least partially encircles said drive shaft.

21. The actuator assembly as set forth in claim 1, wherein said third section of said housing is comprised of a metallic material, with said coupling of said motor assembly with said third section providing a heat sink for said motor assembly through said third section.

22. An actuated turbocharger system for use with an engine of a vehicle, said actuated turbocharger system comprising:

a turbocharger for pressurizing air into the engine;

a pressure control mechanism coupled to said turbocharger and movable between a plurality of states for regulating the pressure of the air produced by said turbocharger; an output shaft coupled to said pressure control mechanism and movable between a plurality of positions corresponding with the plurality of states of said pressure control mechanism; and an actuator assembly for moving said output shaft between said plurality of positions, said actuator assembly comprising:

a housing having at least a first section, a second section, and a third section each having an internal surface, with said third section positioned between said first and second sections such that said internal surfaces of said first and third sections at least partially define a first cavity and said internal surfaces of said second and third sections at least partially define a second cavity;

a motor assembly having a drive shaft rotatable about a shaft axis and capable of transmitting rotational force with said drive shaft, with said motor assembly at least partially disposed in said first cavity and said drive shaft extending through said third section of said housing such that said drive shaft is at least partially disposed in said second cavity, and with said motor assembly coupled to said third section of said housing;

at least one drive gear disposed within said second cavity of said housing, with said at least one drive gear fixed to and rotatable with said drive shaft of said motor assembly; and at least one driven gear disposed within said second cavity of said housing and rotatably coupled with said output shaft, with said at least one driven gear directly coupled to said third section of said housing, and with said at least one driven gear rotatably coupled with said at least one drive gear such that said at least one driven gear is capable of transmitting rotation from said drive shaft of said motor assembly to said output shaft to move said output shaft between the plurality of positions.

23. An actuator assembly comprising:

a housing having at least a first section, a second section, and a third section each having an internal surface, with said third section positioned between said first and second sections such that said internal surfaces of said first and third sections at least partially define a first cavity and said internal surfaces of said second and third sections at least partially define a second cavity;

a motor assembly having a drive shaft rotatable about a shaft axis and capable of transmitting rotational force with said drive shaft, with said motor assembly at least partially disposed in said first cavity and said drive shaft extending through said third section of said housing such that said drive shaft is at least partially disposed in said second cavity, and with said motor assembly coupled to said third section of said housing;

at least one drive gear disposed within said second cavity of said housing, with said at least one drive gear fixed to and rotatable with said drive shaft of said motor assembly; and at least one driven gear disposed within said second cavity of said housing and configured to be rotatably coupled with an output shaft that is moveable between a plurality of positions, with said at least one driven gear coupled to said third section of said housing, and with said at least one driven gear rotatably coupled with said at least one drive gear such that said at least one driven gear is capable of transmitting rotation from said drive shaft of said motor assembly to the output shaft for moving the output shaft between the plurality of positions;

wherein said at least one driven gear is coupled to said second section of said housing;

wherein said internal surfaces of both of said second and third sections of said housing define a gear retention feature to facilitate coupling of said at least one driven gear with said second and third sections of said housing;

wherein said at least one driven gear defines a hole extending therethrough, with said hole corresponding with said gear retention feature to facilitate coupling of said at least one driven gear with said housing;

wherein each of said second and third sections of said housing individually define a pocket which collectively define said gear retention feature; and further comprising a gear pin extending between a first end and a second end through said hole of said at least one driven gear, with said first end disposed in said pocket defined by said third section of said housing and said second end disposed in said pocket defined by said second section of said housing to facilitate rotatable coupling of said at least one driven gear with said second and third sections of said housing.

* * * * *

UNITED STATES PATENT AND TRADEMARK OFFICE
CERTIFICATE OF CORRECTION

PATENT NO. : 9,879,596 B1  
APPLICATION NO. : 15/492051  
DATED : January 30, 2018  
INVENTOR(S) : Martin P. Bogen et al.

Page 1 of 1

It is certified that error appears in the above-identified patent and that said Letters Patent is hereby corrected as shown below:

In the Claims

Column 14, Line 28, Claim 17: please delete "position of said single sensor group" and replace with -- position of said single magnet group --

Signed and Sealed this  
Twenty-second Day of May, 2018

Andrei Iancu  
*Director of the United States Patent and Trademark Office*